United States Patent [19]
Inagaki

[11] Patent Number: 6,075,637
[45] Date of Patent: Jun. 13, 2000

[54] LASER BEAM SCANNING OPTICAL SYSTEM

[75] Inventor: Yoshihiro Inagaki, Toyokawa, Japan

[73] Assignee: Minolta Co., Ltd., Osaka, Japan

[21] Appl. No.: 08/948,230

[22] Filed: Oct. 9, 1997

[30] Foreign Application Priority Data

Jan. 29, 1997 [JP] Japan ................................ 9-015617

[51] Int. Cl.[7] .................................................. G02B 26/08
[52] U.S. Cl. ........................ 359/205; 359/204; 359/207; 359/216
[58] Field of Search ................................ 359/205–207, 359/662, 216–219

[56] References Cited

U.S. PATENT DOCUMENTS 5,648,864  7/1997  Itabashi ................................. 359/205
5,715,079  2/1998  Ono ...................................... 359/205
5,764,399  6/1998  Iizuka ................................... 359/207

FOREIGN PATENT DOCUMENTS 62-262812  11/1987  Japan .

Primary Examiner—James Phan
Attorney, Agent, or Firm—Sidney & Austin

[57] ABSTRACT

A laser beam scanning optical system composed of a relatively small number of lenses achieves proper correction of lateral chromatic aberration and offers superior optical characteristics. In this scanning optical system, the scanning lens system is composed of lenses made of optical materials that are so combined as to make the entire lens system achromatic. Further, the scanning lens system receives converging, not parallel, laser beams, so that it only needs to have a relatively weak power.

17 Claims, 12 Drawing Sheets

FIG. 3A IMAGE-PLANE FLATNESS
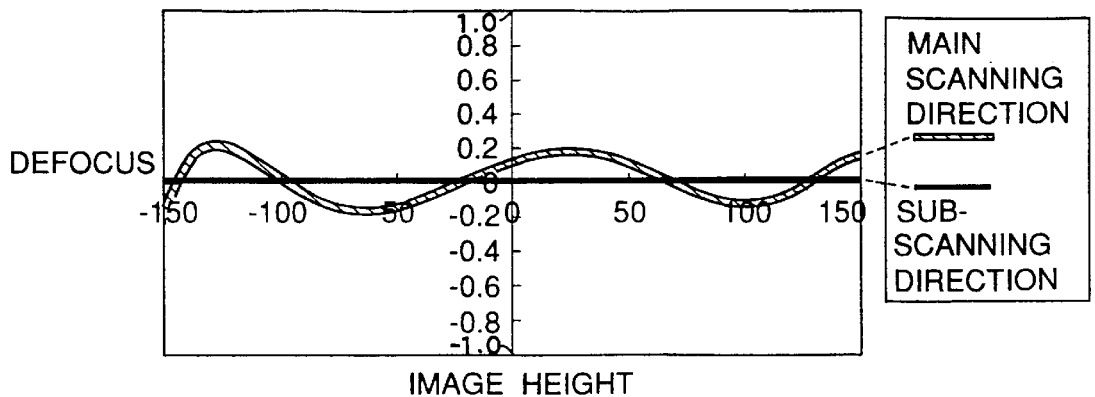
FIG. 3B DISTORTION
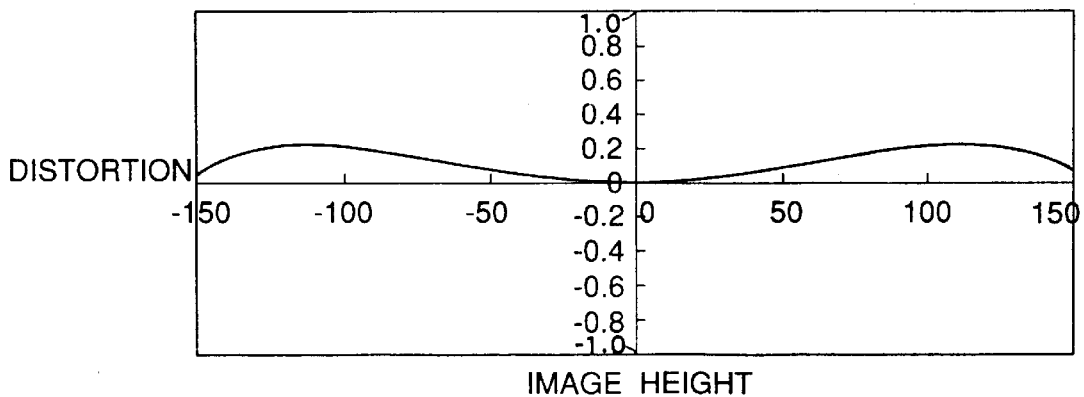
FIG. 3C LATERAL CHROMATIC ABERRATION
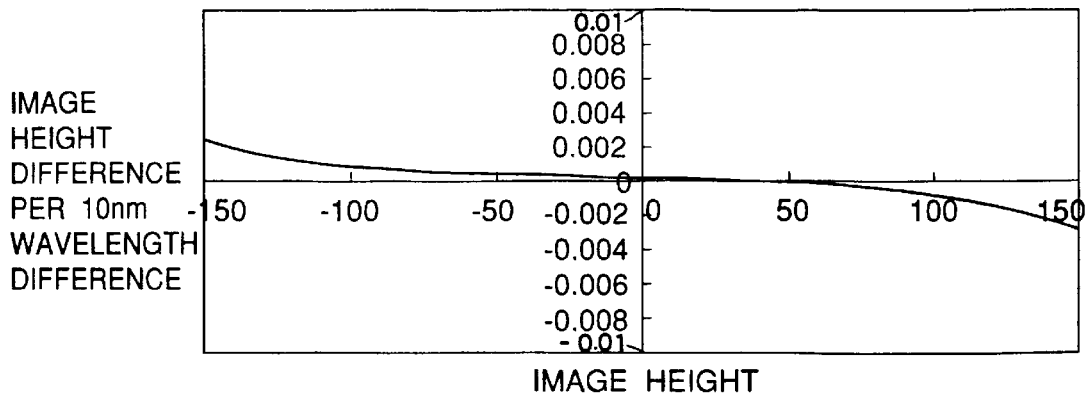

WITH SCANNING LENS AT 1/3 THE TOTAL LENGTH

WITH SCANNING LENS AT 1/2 THE TOTAL LENGTH

FIG. 8A IMAGE-PLANE FLATNESS
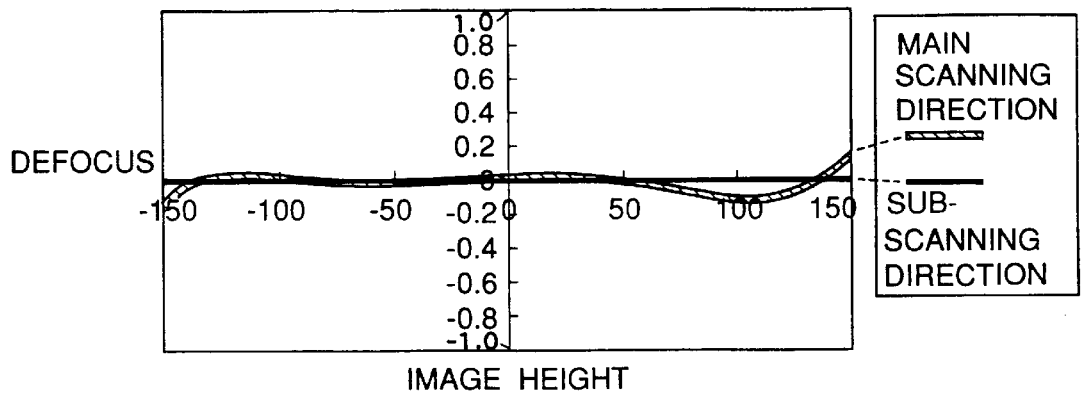
FIG. 8B DISTORTION
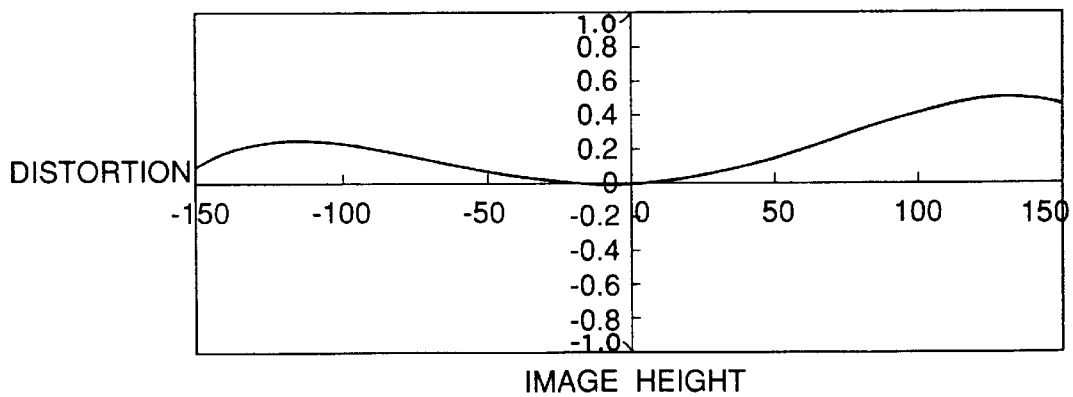
FIG. 8C LATERAL CHROMATIC ABERRATION
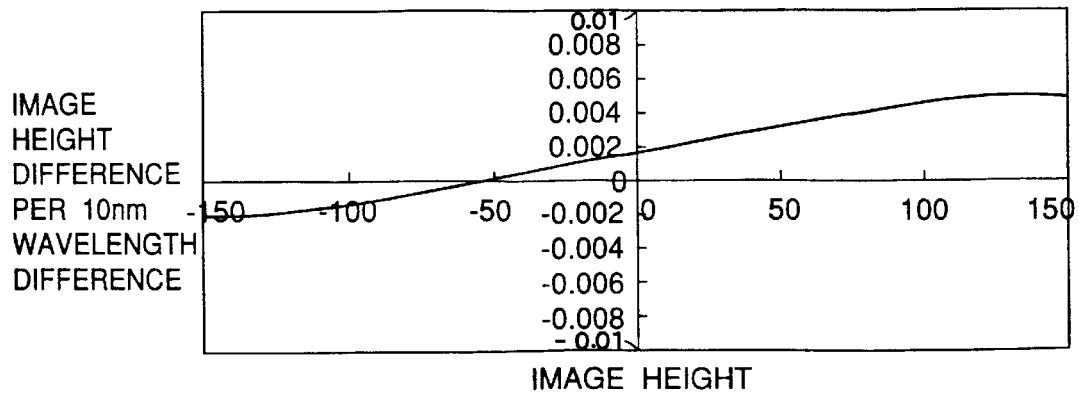

FIG. 9A IMAGE-PLANE FLATNESS
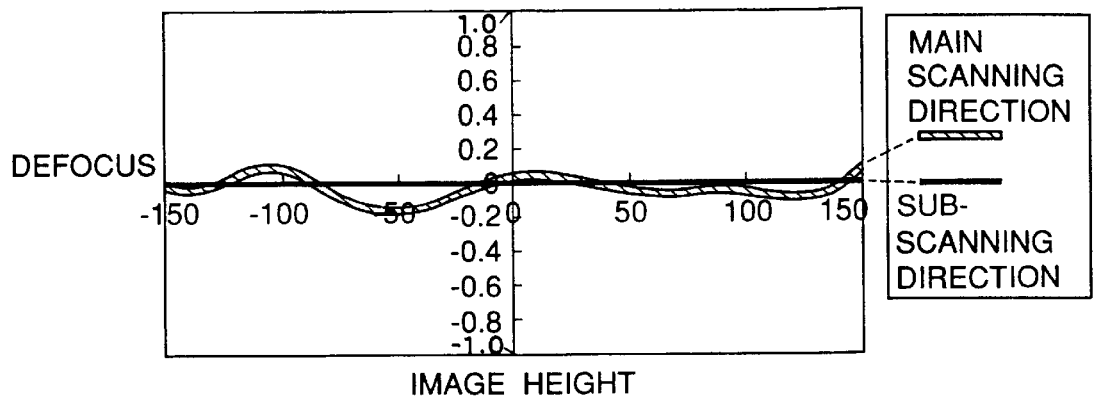
FIG. 9B DISTORTION
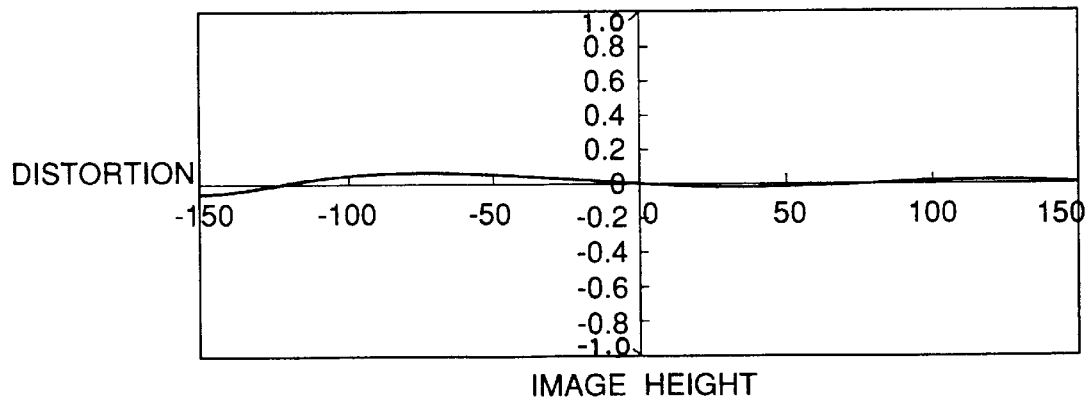
FIG. 9C LATERAL CHROMATIC ABERRATION
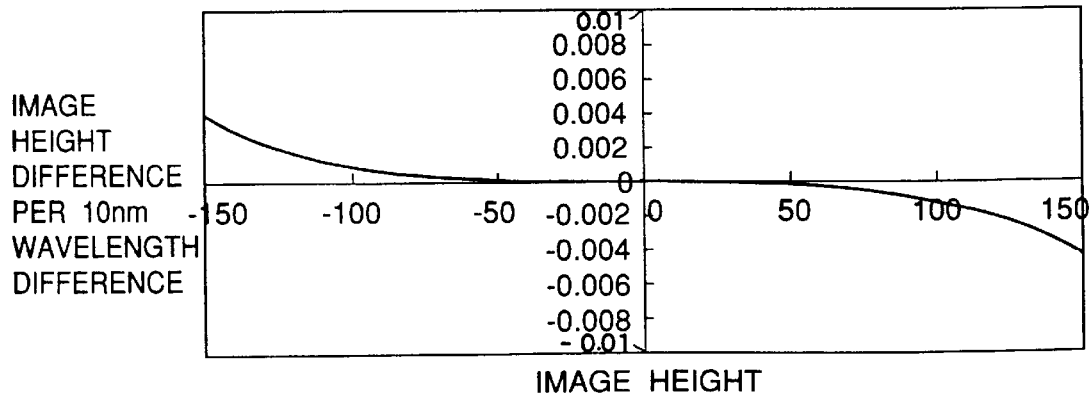

FIG. 10A IMAGE-PLANE FLATNESS
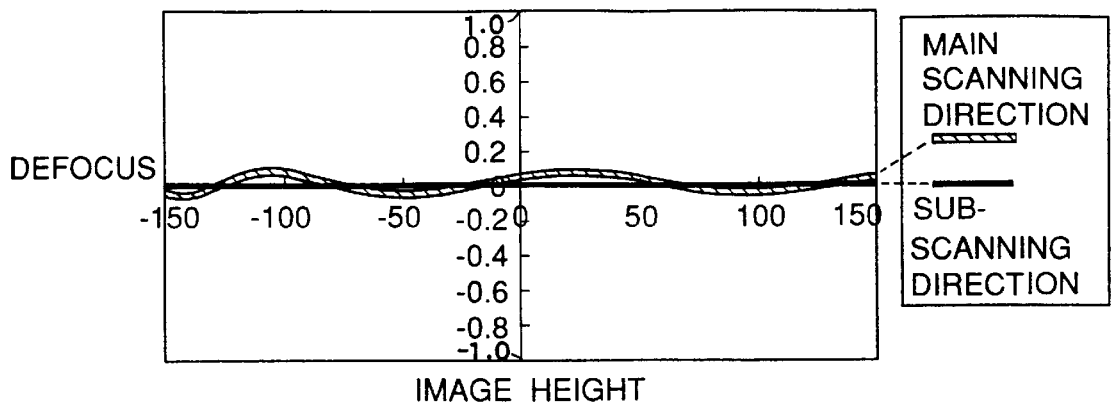
FIG. 10B DISTORTION
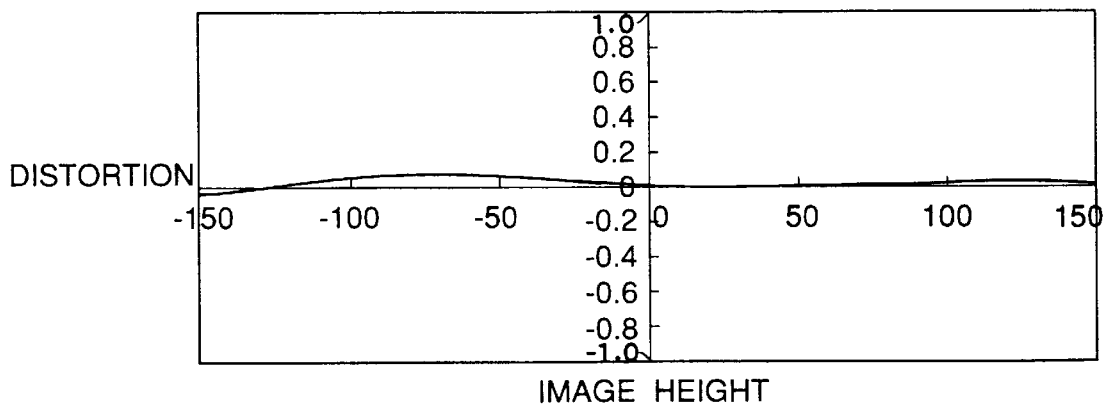
FIG. 10C LATERAL CHROMATIC ABERRATION
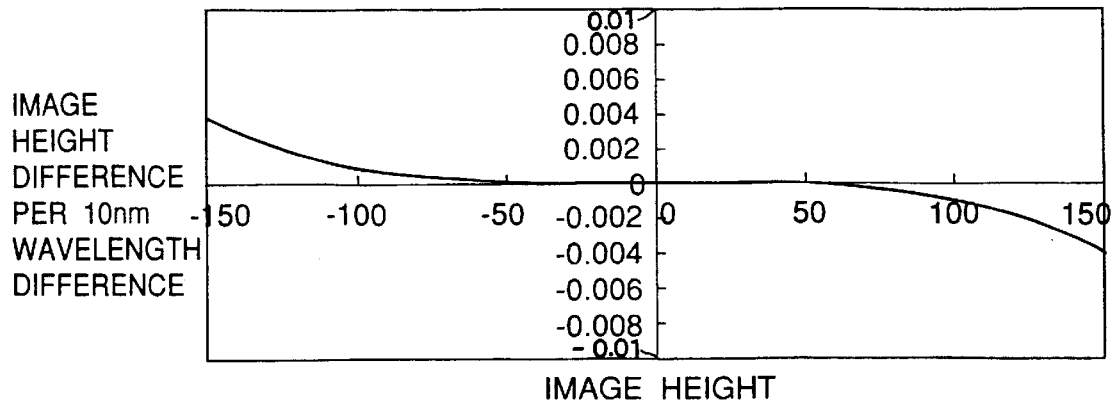

FIG. 11A  IMAGE-PLANE FLATNESS
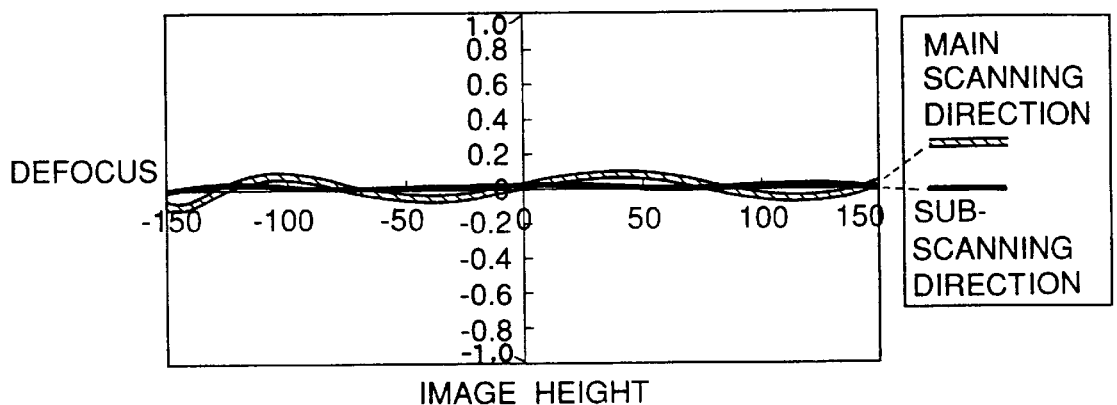
FIG. 11B  DISTORTION
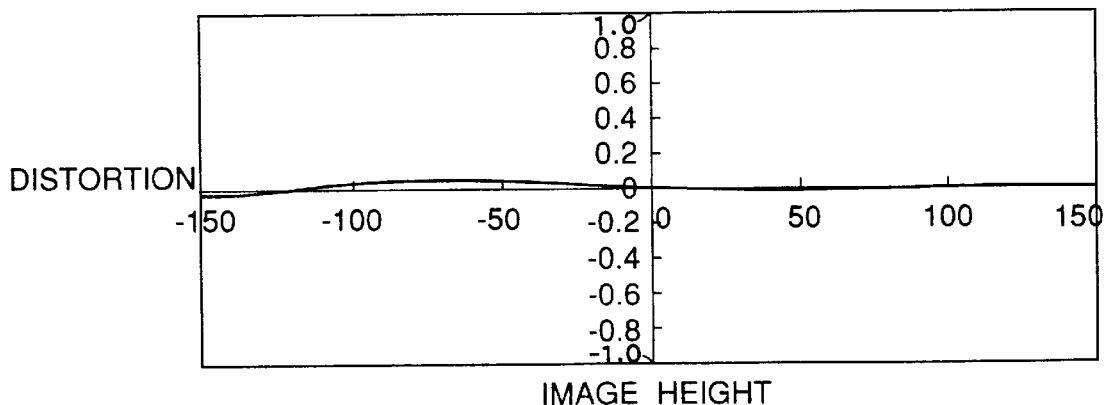
FIG. 11C  LATERAL CHROMATIC ABERRATION
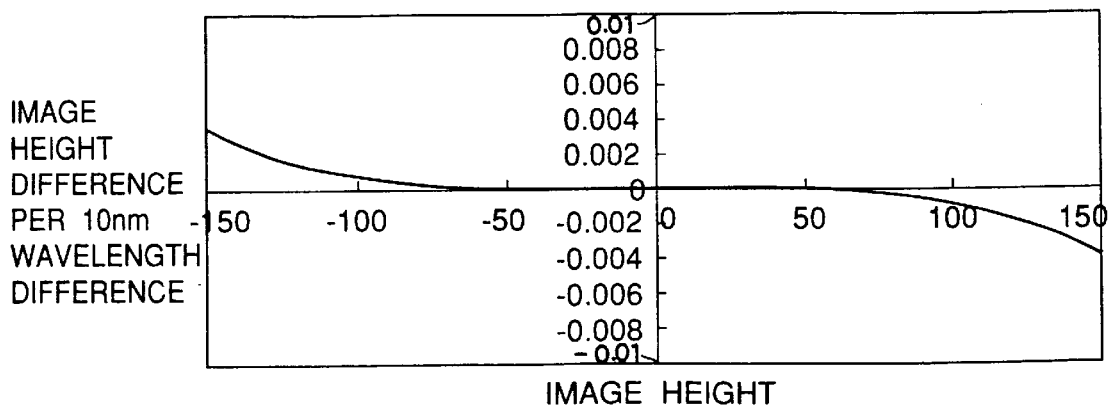

FIG. 12A  IMAGE-PLANE FLATNESS
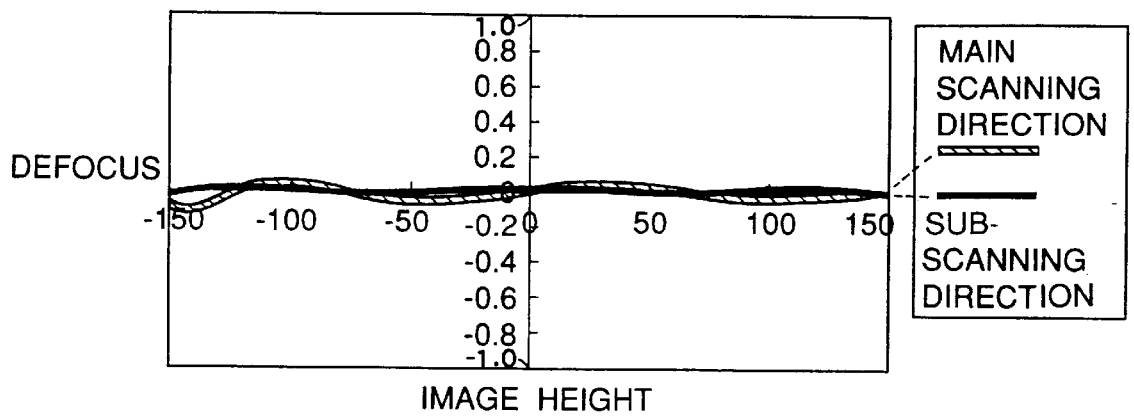
FIG. 12B  DISTORTION
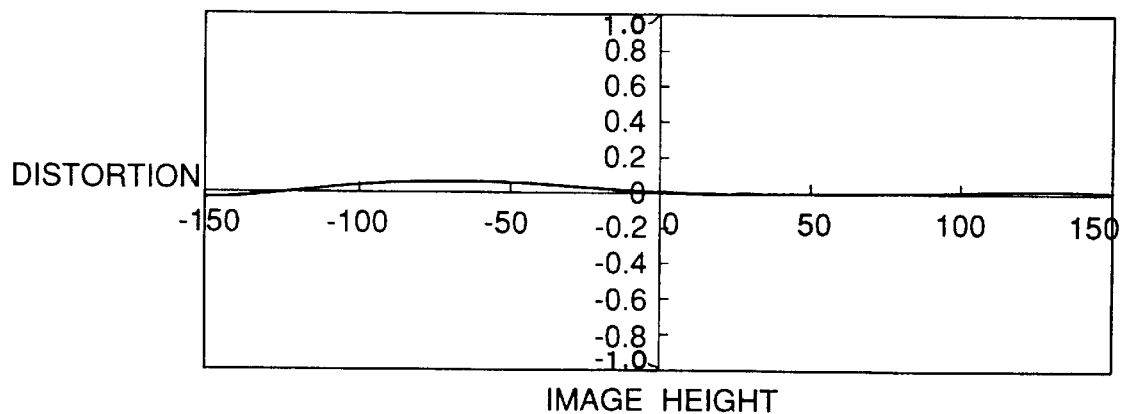
FIG. 12C  LATERAL CHROMATIC ABERRATION
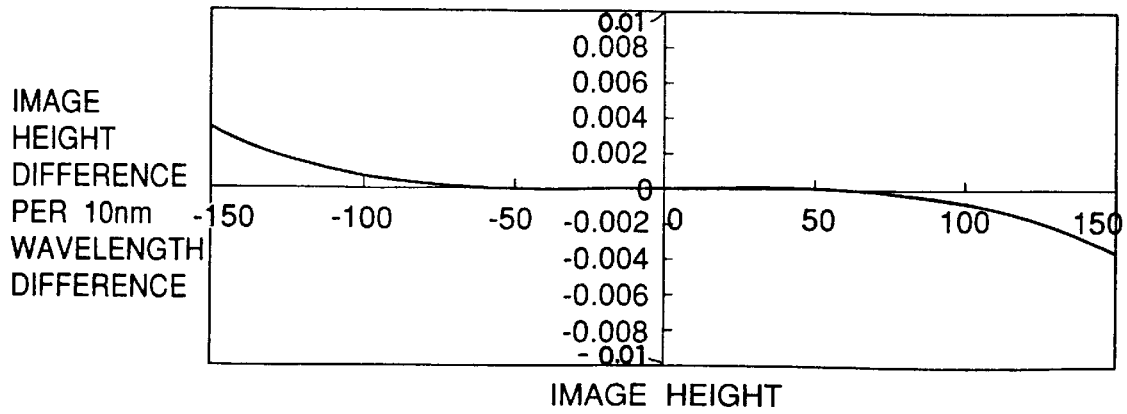

Laser Beam Scanning Optical System

BACKGROUND OF THE INVENTION

1. Field of the Invention

The present invention relates to a laser beam scanning optical system.

2. Description of the Prior Art

A type of laser beam scanning optical system is known that forms images by using a plurality of laser beams having different wavelengths. Such a laser beam scanning optical system is used, for example, to form color images on silver-halide film by using laser beams having wavelengths corresponding to red, green, and blue colors. When a plurality of laser beams having different wavelengths are dealt with by a single scanning lens system, it is inevitable to take chromatic aberration into consideration.

Chromatic aberration includes longitudinal chromatic aberration and lateral chromatic aberration. Longitudinal chromatic aberration causes laser beams of different wavelengths to be focused at different positions along a line parallel to the optical axis. However, since laser beams exhibit relatively large depths of focus, longitudinal chromatic aberration does not cause serious problems. On the other hand, lateral chromatic aberration causes laser beams of different wavelengths to be focused at different positions along a line perpendicular to the optical axis (i.e., in the main scanning direction). As a result, laser beams of different wavelengths scan different scan widths on the image plane, and this degrades the quality of produced images.

As a scanning lens system that corrects such lateral chromatic aberration, Japanese Laid-open Patent Application No. S62-262812, for example, proposes an fθ lens. This fθ lens is composed of optical elements made of carefully selected optical materials to achieve correction of lateral chromatic aberration.

However, in conventional laser beam scanning optical systems, sufficient correction of lateral chromatic aberration is possible only by the use of a combination of a concave lens and a convex lens, each having a strong power. Inconveniently, this not only makes it difficult to obtain satisfactory speed uniformity and image-plane flatness, but also requires a greater number of lens elements as well as extremely high production accuracy.

SUMMARY OF THE INVENTION

An object of the present invention is to provide a laser beam scanning optical system that corrects lateral chromatic aberration properly with a relatively small number of lens elements and that offers superior optical characteristics, particularly in terms of speed uniformity and image-plane flatness.

To achieve the above object, according to one aspect of the present invention, a laser beam scanning optical system is provided with a light source that emits a laser beam; a condenser lens that forms the laser beam into a converging laser beam; a deflector that deflects the converging laser beam; and a scanning lens system that includes a plurality of lenses made of optical materials having different dispersion and that refracts the deflected converging laser beam in such a way that the laser beam is condensed both in a main scanning direction and in a sub-scanning direction to be focused on a scanned surface while being moved across the scanned surface at a substantially uniform speed.

According to another aspect of the present invention, a laser beam scanning optical system is provided with a light source that emits a plurality of laser beams; a condenser lens that forms the laser beams into converging laser beams; a deflector that deflects the converging laser beams; and a scanning lens system that includes a plurality of lenses made of optical materials having different dispersion and that refracts the deflected converging laser beams in such a way that the laser beams are condensed both in a main scanning direction and in a sub-scanning direction to be focused on a scanned surface while being moved across the scanned surface at a substantially uniform speed.

BRIEF DESCRIPTION OF THE DRAWINGS

This and other objects and features of this invention will become clear from the following description, taken in conjunction with the preferred embodiments with reference to the accompanied drawings in which:

FIGS. 3A to 3C are aberration diagrams showing the optical characteristics of the scanning lens system of the first embodiment;

FIGS. 4A and 4B are diagrams schematically showing the principle that the invention relies on;

FIGS. 8A to 8C are aberration diagrams showing the optical characteristics of the scanning lens system of the second embodiment;

FIGS. 9A to 9C are aberration diagrams showing the optical characteristics of the scanning lens system of a third embodiment;

FIGS. 10A to 10C are aberration diagrams showing the optical characteristics of the scanning lens system of a fourth embodiment;

FIGS. 11A to 11C are aberration diagrams showing the optical characteristics of the scanning lens system of a fifth embodiment; and FIGS. 12A to 12C are aberration diagrams showing the optical characteristics of the scanning lens system of a sixth embodiment.

DESCRIPTION OF THE PREFERRED EMBODIMENTS

Hereinafter, embodiments of the present invention will be described with reference to the drawings.

Figure 1:
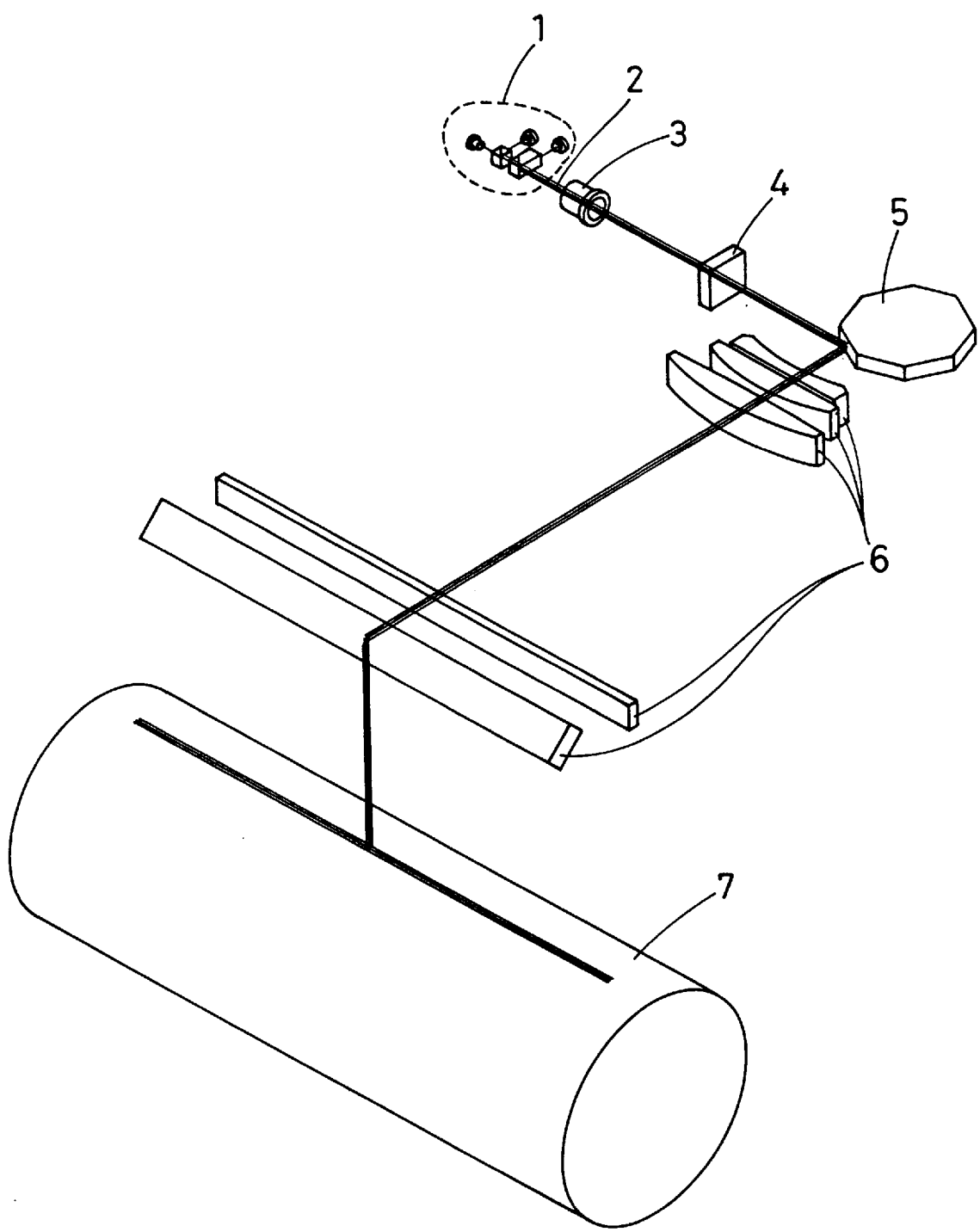
FIG. 1 is a perspective view of the laser beam scanning optical system of a first embodiment of the invention.

FIG. 1 shows the laser beam scanning optical system of a first embodiment of the invention. This scanning optical system is used to form images by using three laser beams 2 having wavelengths corresponding to red, green, and blue colors, and is constituted of a light source block 1, a condenser lens 3, a cylindrical lens 4, a polygon mirror 7, a scanning lens system 6 having a reflecting mirror on the exiting side, and a scanned surface 5 corresponding to the surface of a photoreceptor body. The laser beams 2 emitted from the light source block 1 are made into converging beams by the condenser lens 3 and directed to the cylindrical lens 4. After passing through the cylindrical lens 4, the laser beams 2 condense in the sub-scanning direction and converge in the main scanning direction onto a point in the vicinity of a reflecting surface of the polygon mirror 5, and are deflected by the polygon mirror 5. After being deflected by the polygon mirror 5, the laser beams 2 are refracted and reflected by the scanning lens system 6 to condense in both main and sub scanning directions onto the scanned surface 7 while moving across the scanned surface 7 at a uniform speed. As a result, an image (a latent image) is formed on the scanned surface 7.

Figure 2A:
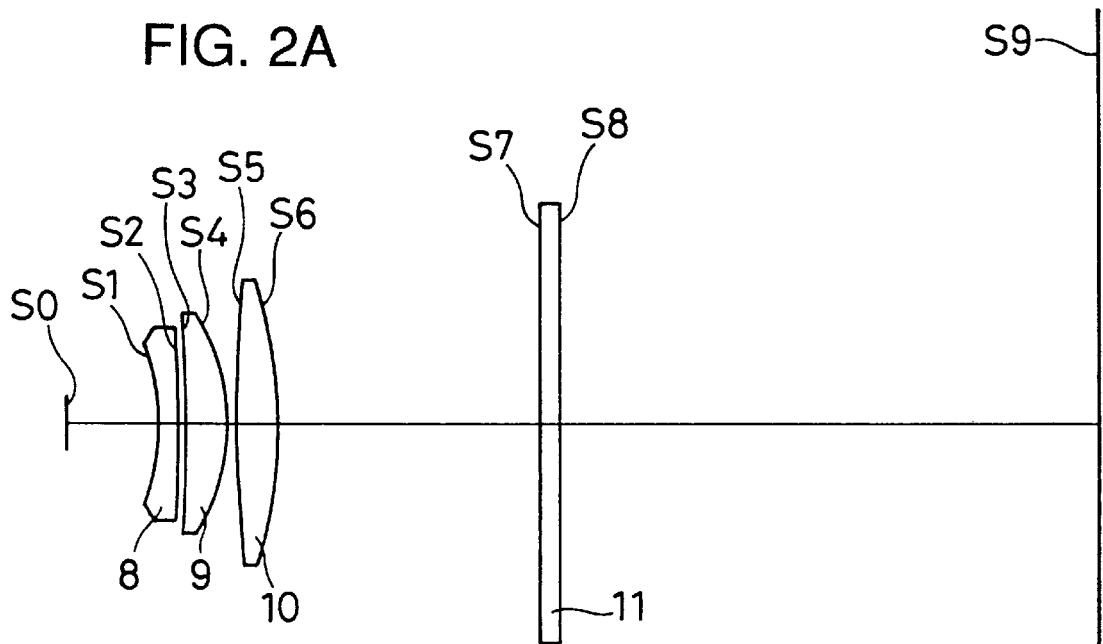
FIGS. 2A and 2B are lens arrangement diagrams of the scanning lens system employed in the first embodiment.
Figure 2B:
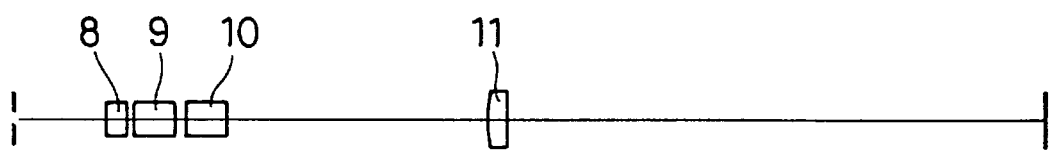

FIGS. 2A and 2B show the lens arrangement of the scanning lens system 6 (excluding the reflecting mirror) that is arranged between the reflecting surface (deflection point) S0 of the polygon mirror 5 and the image plane (scanned surface 7) S9, with FIG. 2A showing the cross section in the main scanning direction and FIG. 2B showing the cross section in the sub-scanning direction. The scanning lens system 6 is composed of, from the reflecting surface S0 side, a spherical concave lens 8, a spherical convex lens 9, a spherical convex lens 10, and a non-axisymmetric aspherical lens 11. To achieve proper correction of lateral chromatic aberration, the concave lens 8, the convex lenses 9 and 10, and the non-axisymmetric aspherical lens 11 are made of optical materials having different dispersion. The non-axisymmetric aspherical lens 11 has, on the reflecting surface S0 side, a non-axisymmetric aspherical surface S7, and, on the image plane S9 side, a flat surface S8. The non-axisymmetric surface S7 has a stronger power in the sub-scanning direction than in the main scanning direction.

Figure 4A:
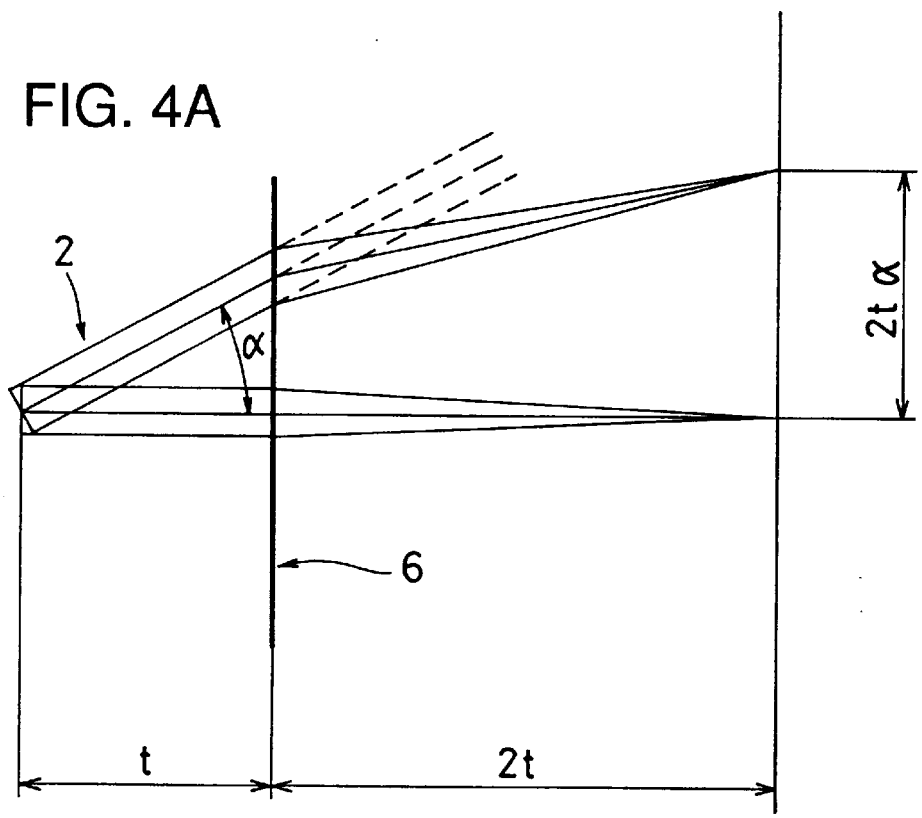
Figure 4B:
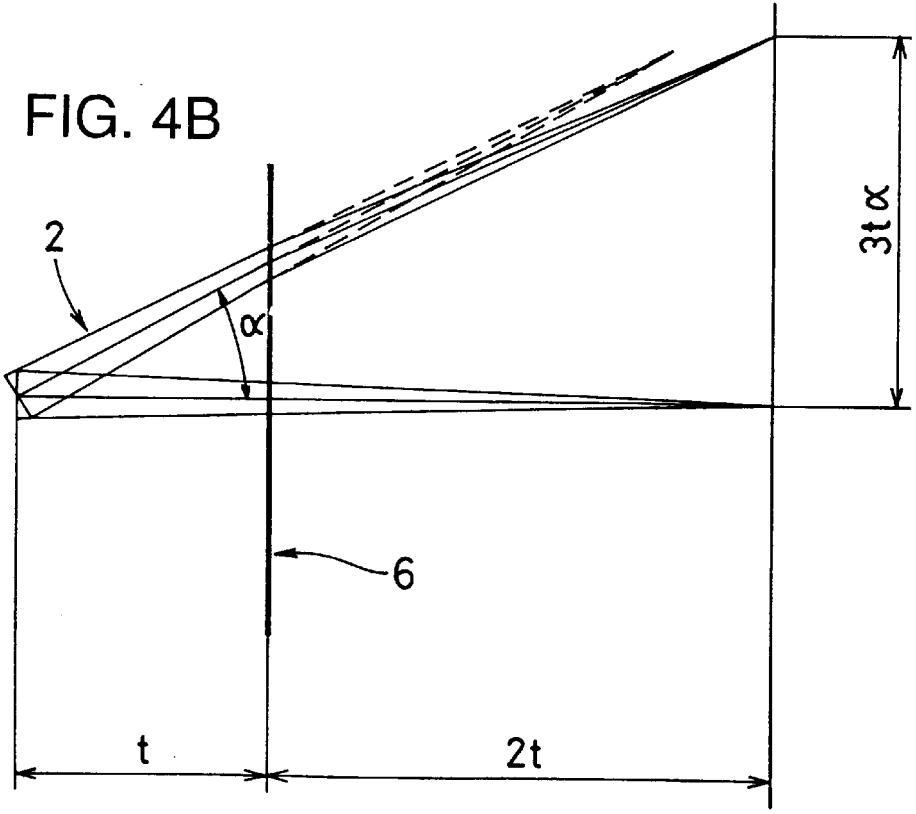

Here, a description is given as to why the laser beams 2, directed to the scanning lens system 6, are made into converging beams. FIGS. 4A and 4B show how lateral chromatic aberration appears differently between the case where the laser beams 2 entering the scanning lens system 6 are parallel beams (FIG. 4A) and the case where they are converging beams (FIG. 4B). For simplicity, in these figures, the scanning lens system 6 is illustrated as a thin lens. Moreover, these figures assume that, in the scanning lens system 6, proper correction of speed uniformity is achieved. Moreover, it is assumed that the distance from the axis of the polygon mirror 5 to its reflecting surface is zero, and that the center of rotation of the polygon mirror 5 is on the optical axis of the scanning lens system 6.

Furthermore, for the case where the laser beams 2 are converging beams (FIG. 4B), it is assumed that, at least on the optical axis, the point on which the laser beams would converge if the scanning lens system 6 were not provided (i.e., the natural convergence point) coincides with the point on which the laser beams 2 will converge when they pass through the scanning lens system 6. Let the distance from the polygon mirror 5 to the scanning lens system 6 be t. Then, the focal length of the scanning lens system 6 is 2t in the case shown in FIG. 4A where the laser beams are parallel beams, and it is infinitely great in the case shown in FIG. 4B where the laser beams are converging beams. From these focal lengths, it is possible, for each of these cases, to calculate the image height observed when the angle formed by the laser beams 2 is reflected by the polygon mirror 5 with respect to the optical axis of the scanning lens system 6 is $\alpha$ (radians).

In the case shown in FIG. 4A where the laser beams are parallel, the so-called f$\theta$ condition is satisfied, and therefore the image height can be expressed as $2t\alpha$. On the other hand, in the case shown in FIG. 4B where the laser beams are converging, the focal length is infinitely great in the paraxial region, and therefore, provided that the angle $\alpha$ is sufficiently small, the image height can be expressed as $3t\alpha$. Moreover, in this case, since it is assumed that proper correction of speed uniformity is achieved, the image height can be expressed as $3t\alpha$ even outside of the paraxial region.

Figure 5:
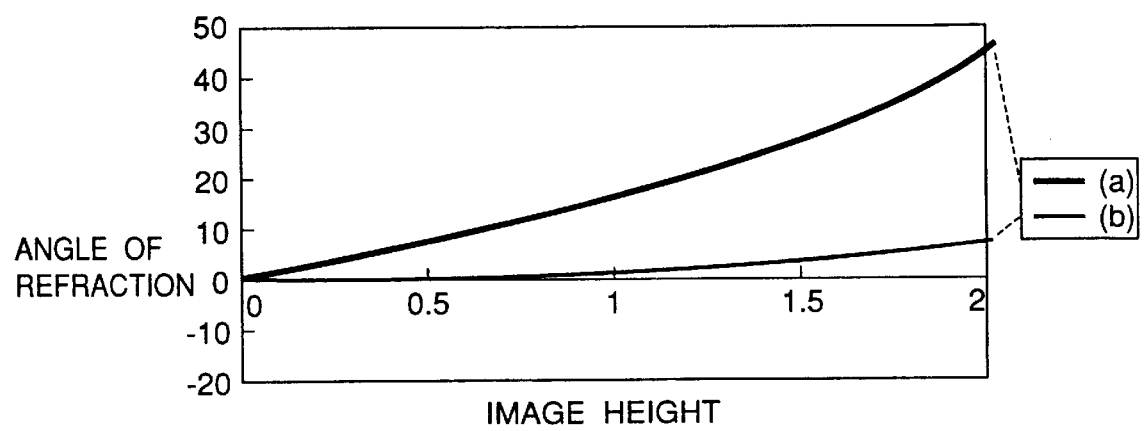
FIG. 5 is a chart showing the angle of refraction with which a laser beam is refracted by the scanning lens system shown in FIGS. 4A and 4B.

FIG. 5 shows, for the cases shown in FIGS. 4A and 4B, how the angle between the laser beams 2 entering the scanning lens system 6 and the laser beams 2 exiting therefrom (i.e., the angle of refraction) varies with the image height (as expressed using t as a unit). From this figure, it is seen that, at the same image height, parallel beams (indicated by graph (a)) are refracted more than converging beams (indicated by graph (b)) by the scanning lens system 6. This means that, in the scanning lens system 6, converging beams (b) cause less lateral chromatic aberration than parallel beams (a).

To correct lateral chromatic aberration, it is necessary to combine a plurality of lenses made of optical materials having different dispersion. However, in so doing, it is better to combine such optical materials that, when made into a single lens, cause relatively small lateral chromatic aberration. This is because, then, the differences in dispersion between materials and the differences in power between lens elements will be so small that optical characteristics other than chromatic aberration correction characteristics are left almost unchanged. In reality, calculation methods for single thin lenses are not always strictly applicable to real optical systems, but they still serve to provide at least the tendencies of the characteristics of an optical system.

Based on considerations as noted above, the laser beam scanning optical system embodying the present invention is so designed that the scanning lens system 6 receives converging, not parallel, laser beams, and that the scanning lens system 6 includes a plurality of lenses made of optical materials having different dispersion (i.e., a combination of optical materials that makes the entire system achromatic is employed). As a result, the power of the scanning lens system 6 can be made weaker than in a case where the scanning lens system 6 receives parallel beams. This helps to make smaller the angle with which the laser beams are, at both ends of an image, refracted toward the optical axis, and thus to make lateral chromatic aberration smaller. This means that the powers of the concave and convex lenses for correcting lateral chromatic aberration can be made weaker. In this way, it is possible to obtain satisfactory lateral chromatic aberration correction characteristics by the use of a relatively small number of lens elements, without sacrificing other optical characteristics, and without requiring unduly high production accuracy.

Figure 6A:
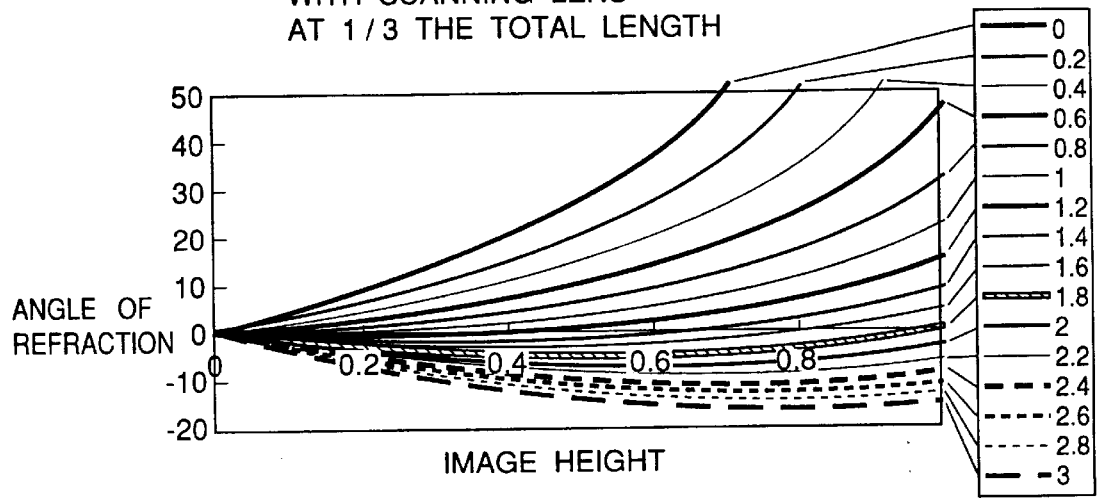
FIGS. 6A and 6B are charts showing how the angle of refraction, with which a laser beam is refracted, is affected by the position and the magnification of the scanning lens system.
Figure 6B:
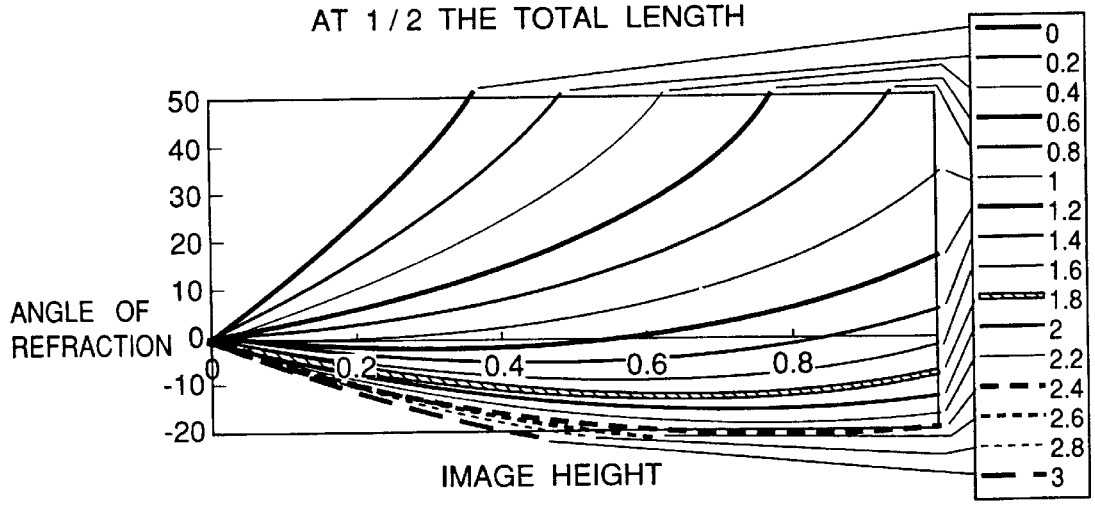

FIGS. 6A and 6B show the results of the same calculation as performed for FIG. 5 but with different positions and main-scanning-direction magnifications (i.e., from 0 to 3) of the scanning lens system 6. FIG. 6A shows how the angle of refraction varies with the image height when the scanning lens system 6 is placed at a distance equal to a third of the total lens length (i.e., the distance from the reflecting surface of the polygon mirror to the image plane) from the reflecting surface of the polygon mirror. FIG. 6B shows how the angle of refraction varies with the image height when the scanning lens system 6 is placed at the midpoint between the reflecting surface of the polygon mirror and the image plane. Note that, in FIGS. 6A and 6B, the image height, taken along the horizontal axis, is expressed as the ratio of the height (length) to the total lens length, and the angle of refraction, taken along the vertical axis, is expressed as the angle between the beams entering the scanning lens system 6 and the beams exiting therefrom. A positive angle of refraction indicates that the beams are refracted toward the optical axis, and a negative angle of refraction indicates that they are refracted away from the optical axis.

In FIG. 6A, the graph showing the case of zero magnification corresponds to graph (a) in FIG. 5, and the graph showing the case of 1× magnification corresponds to graph (b) in FIG. 5. From FIGS. 6A and 6B, it is seen that, when the magnification is varied in the range from zero to 3×, the angle of refraction is smaller in all the cases except in the case of zero magnification. Moreover, it is also seen that, when the magnification is 1.2× or lower, the most part of each graph falls in the region where the angle of refraction is positive. This means that, to correct lateral chromatic aberration, it is necessary to combine lenses having positive and negative powers in such a way that the negative lenses have higher dispersion.

Based on considerations as noted above, in a laser beam scanning optical system, like the one embodying the invention, provided with a scanning lens system that includes a plurality of lenses made of optical materials having different dispersion for the correction of lateral chromatic aberration and that receives converging laser beams, it is preferable that the scanning lens system 6 satisfy condition (1) below.

$$0<\beta<3 \quad (1)$$

where $\beta$ represents the magnification of the scanning lens system 6 in the main scanning direction in the paraxial region.

Moreover, in a laser beam scanning optical system, like the one embodying the invention, provided with a scanning lens system that includes at least one lens having a negative axial power in the main scanning direction and at least one lens having a positive axial power in the main scanning direction, it is preferable that conditions (2) and (3) below be satisfied.

$$0<\beta<1.2 \quad (2)$$

$$\nu_{dM}<\nu_{dP} \quad (3)$$

where $\nu_{dM}$ represents the Abbe number of the lens that has the strongest negative axial power in the main scanning direction, and $\nu_{dP}$ represents the Abbe number of the lens that has the strongest positive axial power in the main scanning direction.

Furthermore, in a laser beam scanning optical system 6, like the one embodying the invention, provided with a scanning lens system that includes, from the deflection point side, three axisymmetric lenses (corresponding to the spherical lenses 8, 9, and 10) and an anamorphic lens (corresponding to the non-axisymmetric aspherical lens 11), it is preferable that conditions (4) to (10) below be satisfied.

$$-0.4L<f_1<-0.2L \quad (4)$$

$$0.3L<f_2<0.6L \quad (5)$$

$$f_2<f_3<3f_2 \quad (6)$$

$$|f_{4M}|>2L \quad (7)$$

$$\nu_{d1}<30 \quad (8)$$

$$\nu_{d2}>50 \quad (9)$$

$$\nu_{d3}>50 \quad (10)$$

where

L represents the distance from the deflection point to the image plane, $f_1$ represents the focal length of the first axisymmetric lens from the deflection point side, $f_2$ represents the focal length of the second axisymmetric lens from the deflection point side, $f_3$ represents the focal length of the third axisymmetric lens from the deflection point side, $f_{4M}$ represents the focal length of the anamorphic lens in the main scanning direction, $\nu_{d1}$ represents the Abbe number of the first axisymmetric lens from the deflection point side, $\nu_{d2}$ represents the Abbe number of the second axisymmetric lens from the deflection point side, and $\nu_{d3}$ represents the Abbe number of the third axisymmetric lens from the deflection point side.

Conditions (4) to (6) define the conditions that need to be satisfied to obtain satisfactory image-plane flatness and speed uniformity. Condition (6) defines the condition that needs to be satisfied to suppress coma aberration as well. Condition (7) defines the condition that needs to be satisfied to make the thickness of the anamorphic lens substantially uniform in the main scanning direction. The anamorphic lens is used to condense the laser beams in the sub-scanning direction on the image plane, and therefore the anamorphic lens is preferably placed as close as possible to the image plane so as to be sufficiently insensitive to its positional error. However, as the anamorphic lens is placed closer to the image plane, it needs to be larger. A large lens having a strong power would be too thick at the center, if it is a convex lens, or at the edge, if it is a concave lens, to produce with reasonable cost and ease. For this reason, condition (7) needs to be satisfied. Conditions (8) to (10) define the conditions that need to be satisfied to correct lateral chromatic aberration properly.

Figure 7A:
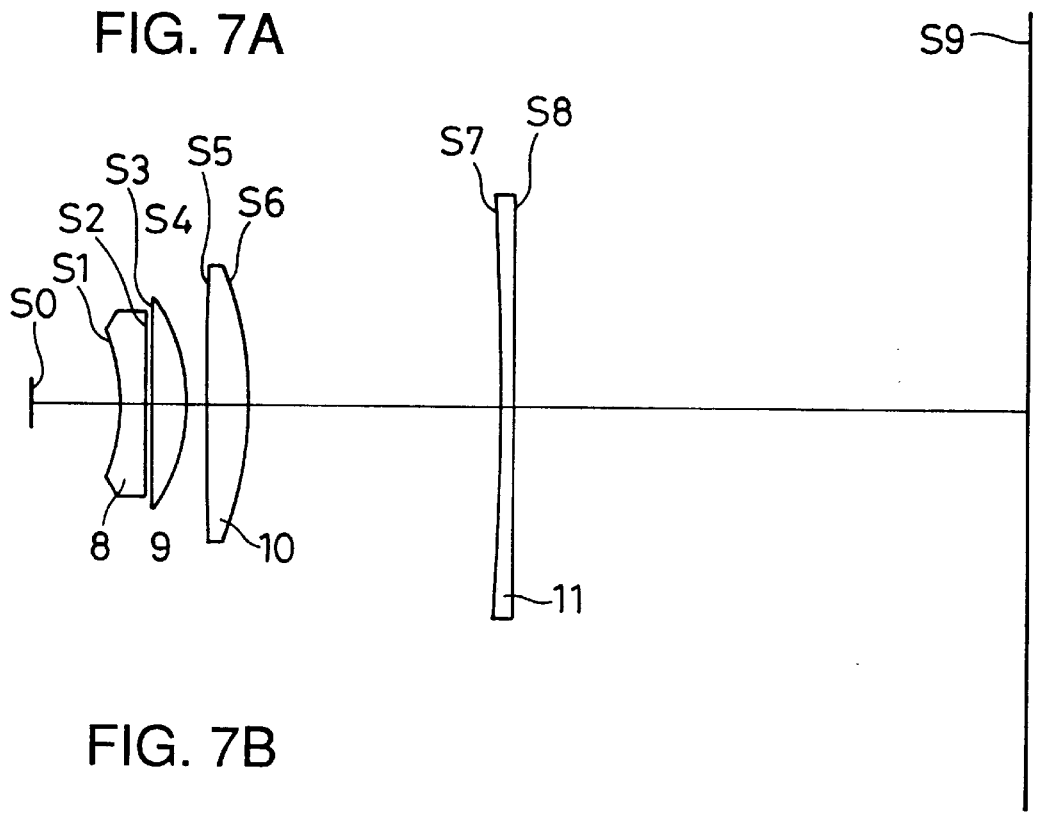
FIGS. 7A and 7B are lens arrangement diagrams of the scanning lens system of a second embodiment of the invention.
Figure 7B:
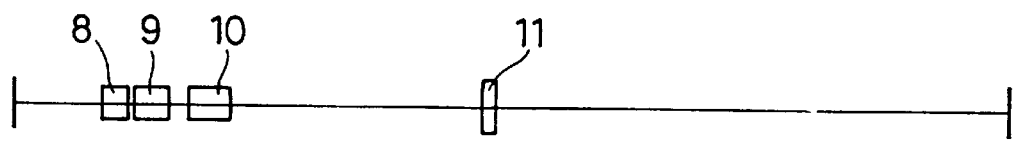

The construction data of the scanning lens system 6 (excluding the reflecting mirror) employed in the first embodiment (FIG. 1) of the invention is listed in Table 1. The lens arrangement of this scanning lens system 6 is shown in FIGS. 2A and 2B, with FIG. 2A showing the cross section in the main scanning direction, and FIG. 2B showing the cross section in the sub-scanning direction. In addition, the construction data of the scanning lens systems of second to sixth embodiments of the invention, which are, just like the one employed in the first embodiment, for use in a laser beam scanning optical system, are listed in Tables 2 to 6. The lens arrangement of the scanning lens system of the second embodiment is shown in FIGS. 7A and 7B, with FIG. 7A showing the cross section in the main scanning direction and FIG. 7B showing the cross section in the sub-scanning direction.

In the construction data of each embodiment, Si (i=1, 2, 3, . . . ) represents the i-th surface from the reflecting surface S0 of the polygon mirror, ri (i=1, 2, 3, . . . ) represents the radius of curvature of the i-th surface Si from the reflecting surface S0, di (i=1, 2, 3, . . . ) represents the i-th axial distance from the reflecting surface S0, and d0 represents the distance from the reflecting surface S0 to the surface S1 closest thereto within the scanning lens system 6. Moreover, Ni (i=1, 2, 3, . . . ) represents the refractive index of the i-th lens from the reflecting surface S0 for a laser beam having a wavelength of 780 nm, and vi (i=1, 2, 3, . . . ) represents the Abbe number of the i-th lens from the reflecting surface S0 for the d-line.

On the other hand, Table 7 lists, for each embodiment, the distance SX from the deflection point in the main scanning direction, to the natural convergence point of an incoming laser beam, the paraxial magnification β of the scanning lens system 6 in the main scanning direction, the distance L from the deflection point to the image plane, and the focal lengths $f_1$, $f_2$, $f_3$, and $f_{4M}$.

The shape of a non-axisymmetric aspherical surface Si is defined by formula (AS1) below, and the shape of an axisymmetric aspherical surface Si is defined by formula (AS2) below. Note that, in both formulae, positions are represented as coordinates (x, y, z) in the coordinate system that has its origin at the vertex of the corresponding lens.

$$x = \sum_{i=0}^{10} \sum_{j=0}^{2} (ai, j) \cdot y^i z^j \qquad \text{(AS1)}$$

$$x = \frac{c \cdot (y^2 + z^2)}{1 + \{1 - \varepsilon \cdot c^2 \cdot (y^2 + z^2)\}^{1/2}} + \sum_{j=4}^{10} (ai) \cdot (y^2 + z^2)^{1/2} \qquad \text{(AS2)}$$

where x represents the coordinate in the optical-axis direction, y represents the coordinate in the main scanning direction, z represents the coordinate in the sub-scanning direction, ai,j represents the aspherical coefficient of i-th order with respect to y and j-th order with respect to z, c represents the paraxial radius of curvature, ∈ represents the eccentricity, and ai represents the aspherical coefficient of i-th order.

The optical characteristics of the scanning lens system 6 of the first embodiment are shown in aberration diagrams FIGS. 3A–3C. The optical characteristics of the scanning lens systems of the second to sixth embodiments are shown in aberration diagrams FIGS. 8A–8C, 9A–9C, 10A–10C, 11A–11C, and 12A–12C, respectively. Of these aberration diagrams, FIGS. 3A, 8A, 9A, 10A, 11A, and 12A show image-plane flatness, FIGS. 3B, 8B, 9B, 10B, 11B, and 12B show distortion, and FIGS. 3C, 8C, 9C, 10C, 11C, and 12C show lateral chromatic aberration.

For example, in the first embodiment, the material of the concave lens 8 has higher dispersion than those of the convex lenses 9 and 10. Since the scanning lens system 6 has a positive refractive power as a whole, the concave lens 8 is the key to proper correction of lateral chromatic aberration through combination of different optical materials. In fact, as seen from FIG. 3C, lateral chromatic aberration is corrected satisfactorily in this embodiment.

TABLE 1

<< Embodiment 1 >>

| Surface | Paraxial Radius of Curvature | Axial Distance | Refractive Index | Abbe Number |
|---|---|---|---|---|
| S0 (Reflecting Surface of Polygon Mirror) | | | | |
| | | d0 = 33 | | |
| S1 | r1 = −91.12 | | | |
| | | d1 = 7 | N1 = 1.82489 | ν1 = 23.82 |
| S2 | r2 = −829.02 | | | |
| | | d2 = 2.51 | | |
| S3 | r3 = −612.32 | | | |
| | | d3 = 15 | N2 = 1.51118 | ν2 = 64.20 |
| S4 | r4 = −78.80 | | | |
| | | d4 = 3 | | |
| S5 | r5 = 545.44 | | | |
| | | d5 = 15 | N3 = 1.51118 | ν3 = 64.20 |
| S6 | r6 = −175.46 | | | |
| | | d6 = 92.4 | | |
| S7 (Non-axisymmetric Aspherical Surface) | | | | |
| | | d7 = 7.09 | N4 = 1.51882 | ν4 = 56.38 |
| S8 | r8 = ∞ | | | |
| | | d8 = 195 | | |
| S9 | r9 = ∞ (Evaluation Surface) | | | |

TABLE 1-continued

<< Embodiment 1 >>

[Coefficient $a_{i,j}$ of Non-axisymmetric Aspherical Surface S7]

| | | | |
|---|---|---|---|
| $a_{0,0}$ = | 0, | $a_{0,2}$ = | 1.00058 × $10^{-2}$ |
| $a_{1,0}$ = | −4.03924 × $10^{-3}$, | $a_{1,2}$ = | −3.99575 × $10^{-7}$ |
| $a_{2,0}$ = | −5.67375 × $10^{-5}$, | $a_{2,2}$ = | −2.65668 × $10^{-7}$ |
| $a_{3,0}$ = | −1.44489 × $10^{-7}$, | $a_{3,2}$ = | −6.26684 × $10^{-11}$ |
| $a_{4,0}$ = | 1.29906 × $10^{-8}$, | $a_{4,2}$ = | 7.95788 × $10^{-12}$ |
| $a_{5,0}$ = | 1.64333 × $10^{-11}$, | $a_{5,2}$ = | 3.73978 × $10^{-15}$ |
| $a_{6,0}$ = | −5.60506 × $10^{-13}$, | $a_{6,2}$ = | −1.13544 × $10^{-16}$ |
| $a_{7,0}$ = | −1.58390 × $10^{-15}$, | $a_{7,2}$ = | −3.65112 × $10^{-20}$ |
| $a_{8,0}$ = | 9.27712 × $10^{-18}$, | $a_{8,2}$ = | −8.78322 × $10^{-22}$ |
| $a_{9,0}$ = | 4.37992 × $10^{-20}$, | $a_{9,2}$ = | 0 |
| $a_{10,0}$ = | −6.06240 × $10^{-23}$, | $a_{10,2}$ = | 0 |

TABLE 2

<< Embodiment 2 >>

| Surface | Paraxial Radius of Curvature | Axial Distance | Refractive Index | Abbe Number |
|---|---|---|---|---|
| S0 (Reflecting Surface of Polygon Mirror) | | | | |
| | | d0 = 33 | | |
| S1 | r1 = −79.03 | | | |
| | | d1 = 9.15 | N1 = 1.78571 | ν1 = 25.43 |
| S2 | r2 = ∞ | | | |
| | | d2 = 2 | | |
| S3 | r3 = ∞ | | | |
| | | d3 = 12.93 | N2 = 1.51118 | ν2 = 64.20 |
| S4 | r4 = −73.15 | | | |
| | | d4 = 7.23 | | |
| S5 | r5 = 1991.39 | | | |
| | | d5 = 15 | N3 = 1.51118 | ν3 = 64.20 |
| S6 | r6 = −151.75 | | | |
| | | d6 = 92.47 | | |
| S7 (Non-axisymmetric Aspherical Surface) | | | | |
| | | d7 = 5.22 | N4 = 1.51882 | ν4 = 56.38 |
| S8 | r8 = ∞ | | | |
| | | d8 = 193 | | |
| S9 | r9 = ∞ (Evaluation Surface) | | | |

[Coefficient $a_{i,j}$ of Non-axisymmetric Aspherical Surface S7]

| | | | |
|---|---|---|---|
| $a_{0,0}$ = | 0, | $a_{0,2}$ = | 9.74398 × $10^{-3}$ |
| $a_{1,0}$ = | −7.32833 × $10^{-3}$, | $a_{1,2}$ = | 8.83163 × $10^{-7}$ |
| $a_{2,0}$ = | −4.63813 × $10^{-4}$, | $a_{2,2}$ = | −2.08195 × $10^{-7}$ |
| $a_{3,0}$ = | −4.06105 × $10^{-7}$, | $a_{3,2}$ = | −1.03806 × $10^{-10}$ |
| $a_{4,0}$ = | 2.82401 × $10^{-8}$, | $a_{4,2}$ = | 2.53193 × $10^{-12}$ |
| $a_{5,0}$ = | 1.57277 × $10^{-11}$, | $a_{5,2}$ = | 1.73233 × $10^{-15}$ |
| $a_{6,0}$ = | −3.75354 × $10^{-13}$, | $a_{6,2}$ = | 1.24966 × $10^{-16}$ |
| $a_{7,0}$ = | −6.62341 × $10^{-16}$, | $a_{7,2}$ = | 8.73256 × $10^{-20}$ |
| $a_{8,0}$ = | −1.07999 × $10^{-17}$, | $a_{8,2}$ = | −5.04117 × $10^{-21}$ |

TABLE 3

<< Embodiment 3 >>

| Surface | Paraxial Radius of Curvature | Axial Distance | Refractive Index | Abbe Number |
|---|---|---|---|---|
| S0 (Reflecting Surface of Polygon Mirror) | | | | |
| | | d0 = 33 | | |
| S1 | r1 = −78.39 | | | |
| | | d1 = 7 | N1 = 1.78571 | ν1 = 25.43 |
| S2 | r2 = −392.64 | | | |
| | | d2 = 4 | | |
| S3 | r3 = 205.73 | | | |
| | | d3 = 20 | N2 = 1.51882 | ν2 = 56.38 |
| S4 | r4 = −81.26 | | | |
| | | d4 = 123.65 | | |
| S5 (Non-axisymmetric Aspherical Surface) | | | | |
| | | d5 = 7.35 | N3 = 1.51882 | ν3 = 56.38 |
| S6 | r6 = ∞ | | | |
| | | d6 = 185 | | |
| S7 | r7 = ∞ (Evaluation Surface) | | | |

TABLE 3-continued

<< Embodiment 3 >>

[Coefficient $a_i$ and Eccentricity $\in$ of Axisymmetric Aspherical Surface S3]
$\in$ = 1
$a_4$ = $-1.09821 \times 10^{-6}$
$a_6$ = $4.09155 \times 10^{-10}$
$a_8$ = $-1.23939 \times 10^{-13}$
$a_{10}$ = $2.06364 \times 10^{-17}$

[Coefficient $a_i$ and Eccentricity $\in$ of Axisymmetric Aspherical Surface S4]
$\in$ = 1
$a_4$ = $-2.08639 \times 10^{-7}$
$a_6$ = $-5.32083 \times 10^{-11}$
$a_8$ = $-7.83294 \times 10^{-16}$
$a_{10}$ = $-1.40806 \times 10^{-18}$

[Coefficient $a_{i,j}$ of Non-axisymmetric Aspherical Surface S5]
$a_{0,0}$ = 0,                          $a_{0,2}$ = $9.87934 \times 10^{-3}$
$a_{1,0}$ = $-3.08698 \times 10^{-4}$,  $a_{1,2}$ = $-3.21539 \times 10^{-7}$
$a_{2,0}$ = $5.73056 \times 10^{-6}$,   $a_{2,2}$ = $-2.18432 \times 10^{-7}$
$a_{3,0}$ = $-9.09531 \times 10^{-8}$,  $a_{3,2}$ = $-2.50097 \times 10^{-11}$
$a_{4,0}$ = $1.78801 \times 10^{-8}$,   $a_{4,2}$ = $5.06788 \times 10^{-12}$
$a_{5,0}$ = $-1.75829 \times 10^{-11}$, $a_{5,2}$ = $1.97990 \times 10^{-15}$
$a_{6,0}$ = $-6.42970 \times 10^{-13}$, $a_{6,2}$ = $-3.30373 \times 10^{-17}$
$a_{7,0}$ = $1.30993 \times 10^{-15}$,  $a_{7,2}$ = $-1.14756 \times 10^{-19}$

TABLE 4

<< Embodiment 4 >>

| Surface | Paraxial Radius of Curvature | Axial Distance | Refractive Index | Abbe Number |
|---|---|---|---|---|
| S0 (Reflecting Surface of Polygon Mirror) | | d0 = 33 | | |
| S1 | r1 = $-76.90$ | | | |
|  |  | d1 = 7 | N1 = 1.78571 | v1 = 25.43 |
| S2 | r2 = $-346.56$ | | | |
|  |  | d2 = 4 | | |
| S3 | r3 = 202.63 | | | |
|  |  | d3 = 20 | N2 = 1.51882 | v2 = 56.38 |
| S4 | r4 = $-82.73$ | | | |
|  |  | d4 = 123.61 | | |
| S5 (Non-axisymmetric Aspherical Surface) | | | | |
|  |  | d5 = 7.39 | N3 = 1.51882 | v3 = 56.38 |
| S6 | r6 = $\infty$ | | | |
|  |  | d6 = 185 | | |
| S7 | r7 = $\infty$ (Evaluation Surface) | | | |

[Coefficient $a_i$ and Eccentricity $\in$ of Axisymmetric Aspherical Surface S3]
$\in$ = 1
$a_4$ = $-1.07683 \times 10^{-6}$
$a_6$ = $3.00295 \times 10^{-10}$
$a_8$ = $-3.35001 \times 10^{-14}$
$a_{10}$ = $-7.08758 \times 10^{-19}$

[Coefficient $a_i$ and Eccentricity $\in$ of Axisymmetric Aspherical Surface S4]
$\in$ = 1
$a_4$ = $-1.89715 \times 10^{-7}$
$a_6$ = $-6.55648 \times 10^{-11}$
$a_8$ = $-1.97230 \times 10^{-14}$
$a_{10}$ = $1.15434 \times 10^{-17}$

[Coefficient $a_{i,j}$ of Non-axisymmetric Aspherical Surface S5]
$a_{0,0}$ = 0,                          $a_{0,2}$ = $9.88779 \times 10^{-3}$
$a_{1,0}$ = $4.19175 \times 10^{-4}$,   $a_{1,2}$ = $-3.40238 \times 10^{-7}$
$a_{2,0}$ = $1.84277 \times 10^{-5}$,   $a_{2,2}$ = $-2.20048 \times 10^{-7}$
$a_{3,0}$ = $-8.45122 \times 10^{-8}$,  $a_{3,2}$ = $-2.21497 \times 10^{-11}$
$a_{4,0}$ = $1.66378 \times 10^{-8}$,   $a_{4,2}$ = $5.19270 \times 10^{-12}$
$a_{5,0}$ = $-2.05367 \times 10^{-11}$, $a_{5,2}$ = $1.94814 \times 10^{-15}$
$a_{6,0}$ = $-6.23211 \times 10^{-13}$, $a_{6,2}$ = $-3.41775 \times 10^{-17}$
$a_{7,0}$ = $1.49468 \times 10^{-15}$,  $a_{7,2}$ = $-1.24812 \times 10^{-19}$

TABLE 5

<< Embodiment 5 >>

| Surface | Paraxial Radius of Curvature | Axial Distance | Refractive Index | Abbe Number |
|---|---|---|---|---|
| S0 (Reflecting Surface of Polygon Mirror) | | d0 = 33 | | |
| S1 | r1 = $-78.80$ | | | |
|  |  | d1 = 7 | N1 = 1.78571 | v1 = 25.43 |
| S2 | r2 = $-422.11$ | | | |
|  |  | d2 = 4 | | |
| S3 | r3 = 203.60 | | | |
|  |  | d3 = 20 | N2 = 1.51882 | v2 = 56.38 |
| S4 | r4 = $-80.52$ | | | |
|  |  | d4 = 126 | | |
| S5 | r5 = $\infty$ | | | |
|  |  | d5 = 7.26 | N3 = 1.51882 | v3 = 56.38 |
| S6 (Non-axisymmetric Aspherical Surface) | | | | |
|  |  | d6 = 182.74 | | |
| S7 | r7 = $\infty$ (Evaluation Surface) | | | |

[Coefficient $a_i$ and Eccentricity $\in$ of Axisymmetric Aspherical Surface S3]
$\in$ = 1
$a_4$ = $-1.06397 \times 10^{-6}$
$a_6$ = $4.21383 \times 10^{-10}$
$a_8$ = $-1.28967 \times 10^{-13}$
$a_{10}$ = $2.08091 \times 10^{-17}$

[Coefficient $a_i$ and Eccentricity $\in$ of Axisymmetric Aspherical Surface S4]
$\in$ = 1
$a_4$ = $-1.90996 \times 10^{-7}$
$a_6$ = $-4.45776 \times 10^{-11}$
$a_8$ = $3.32901 \times 10^{-15}$
$a_{10}$ = $-1.57886 \times 10^{-20}$

[Coefficient $a_{i,j}$ of Non-axisymmetric Aspherical Surface S6]
$a_{0,0}$ = 0,                          $a_{0,2}$ = $-9.90741 \times 10^{-3}$
$a_{1,0}$ = $7.07334 \times 10^{-5}$,   $a_{1,2}$ = $2.96426 \times 10^{-7}$
$a_{2,0}$ = $4.99190 \times 10^{-6}$,   $a_{2,2}$ = $2.01488 \times 10^{-7}$
$a_{3,0}$ = $9.98637 \times 10^{-8}$,   $a_{3,2}$ = $5.06814 \times 10^{-11}$
$a_{4,0}$ = $-1.77372 \times 10^{-8}$,  $a_{4,2}$ = $-8.62125 \times 10^{-12}$
$a_{5,0}$ = $1.38778 \times 10^{-11}$,  $a_{5,2}$ = $-2.87783 \times 10^{-16}$
$a_{6,0}$ = $6.04911 \times 10^{-13}$,  $a_{6,2}$ = $2.99700 \times 10^{-16}$
$a_{7,0}$ = $-9.68222 \times 10^{-16}$, $a_{7,2}$ = $-1.86801 \times 10^{-19}$

TABLE 6

<< Embodiment 6 >>

| Surface | Paraxial Radius of Curvature | Axial Distance | Refractive Index | Abbe Number |
|---|---|---|---|---|
| S0 (Reflecting Surface of Polygon Mirror) | | d0 = 33 | | |
| S1 | r1 = $-79.35$ | | | |
|  |  | d1 = 7 | N1 = 1.78571 | v1 = 25.43 |
| S2 | r2 = $-461.75$ | | | |
|  |  | d2 = 4 | | |
| S3 | r3 = 203.87 | | | |
|  |  | d3 = 20 | N2 = 1.51882 | v2 = 56.38 |
| S4 | r4 = $-79.41$ | | | |
|  |  | d4 = 126 | | |
| S5 | r5 = $\infty$ | | | |
|  |  | d5 = 7.11 | N3 = 1.51882 | v3 = 56.38 |
| S6 (Non-axisymmetric Aspherical Surface) | | | | |
|  |  | d6 = 182.89 | | |
| S7 | r7 = $\infty$ (Evaluation Surface) | | | |

[Coefficient $a_i$ and Eccentricity $\in$ of Axisymmetric Aspherical Surface S3]
$\in$ = 1
$a_4$ = $-1.04733 \times 10^{-6}$
$a_6$ = $4.22772 \times 10^{-10}$
$a_8$ = $-1.37922 \times 10^{-13}$
$a_{10}$ = $2.36859 \times 10^{-17}$ TABLE 6-continued << Embodiment 6 >>

[Coefficient $a_i$ and Eccentricity $\in$ of Axisymmetric Aspherical Surface S4]
$\in$ = 1
$a_4$ = $-1.86392 \times 10^{-7}$
$a_6$ = $-4.12037 \times 10^{-11}$
$a_8$ = $3.06271 \times 10^{-15}$
$a_{10}$ = $-1.30802 \times 10^{-18}$

[Coefficient $a_{i,j}$ of Non-axisymmetric Aspherical Surface S6]
$a_{0,0}$ = 0, $a_{0,2}$ = $-9.89970 \times 10^{-3}$
$a_{1,0}$ = $5.49486 \times 10^{-4}$, $a_{1,2}$ = $3.20192 \times 10^{-7}$
$a_{2,0}$ = $1.88864 \times 10^{-5}$, $a_{2,2}$ = $2.02305 \times 10^{-7}$
$a_{3,0}$ = $9.60242 \times 10^{-8}$, $a_{3,2}$ = $4.90927 \times 10^{-11}$
$a_{4,0}$ = $-1.84186 \times 10^{-8}$, $a_{4,2}$ = $-8.77922 \times 10^{-12}$
$a_{5,0}$ = $1.42526 \times 10^{-11}$, $a_{5,2}$ = $-1.94333 \times 10^{-16}$
$a_{6,0}$ = $6.16912 \times 10^{-13}$, $a_{6,2}$ = $3.06478 \times 10^{-16}$
$a_{7,0}$ = $-9.88806 \times 10^{-16}$, $a_{7,2}$ = $-1.92673 \times 10^{-19}$

TABLE 7

| Embodiment | SX | β | L | $f_1$ | $f_2$ | $f_3$ | $f_{4M}$ |
|---|---|---|---|---|---|---|---|
| 1 | 900 | 0.30 | 370 | −125 | 175 | 259 | −16986 |
| 2 | 500 | 0.57 | 370 | −101 | 143 | 276 | −2078 |
| 3 | 600 | 0.50 | 380 | — | — | — | — |
| 4 | 600 | 0.50 | 380 | — | — | — | — |
| 5 | 600 | 0.50 | 380 | — | — | — | — |
| 6 | 600 | 0.50 | 380 | — | — | — | — |

What is claimed is:

1. A laser beam scanning optical system comprising:
a light source for emitting at least one laser beam;
a condenser lens for forming at least one laser beam emitted from the light source into at least one converging laser beam;
a deflector for deflecting each converging laser beam from the condenser lens; and
a scanning lens system that includes a plurality of lenses made of optical materials having different dispersion that operatively corrects lateral chromatic aberration caused therein and that refracts each converging laser beam received from the deflector in such a way that the laser beam is condensed both in a main scanning direction and in a sub-scanning direction on a scanned surface,
wherein the following condition is fulfilled:

$0 < \beta < 3$ where, β represents magnification of the scanning lens system in the main scanning direction within a region close to an optical axis.

2. A laser beam scanning optical system as claimed in claim 1,
wherein the following condition is fulfilled:

$0 < \beta < 1.2$.

3. A laser beam scanning optical system as claimed in 1,
wherein the scanning lens system includes, from a deflection point side, three axisymmetric lenses and one anamorphic lens, and
wherein the following condition is fulfilled:

$-0.4L < f_1 < -0.2L$ where L represents a distance from a deflection point to an image plane, and $f_1$ represents a focal length of a first axisymmetric lens from the deflection point side.

4. A laser beam scanning optical system as claimed in 1,
wherein the scanning lens system includes, from a deflection point side, three axisymmetric lenses and one anamorphic lens, and
wherein the following condition is fulfilled:

$0.3L < f_2 < 0.6L$ where L represents a distance from a deflection point to an image plane, and $f_2$ represents a focal length of a second axisymmetric lens from the deflection point side.

5. A laser beam scanning optical system as claimed in 1,
wherein the scanning lens system includes, from a deflection point side, three axisymmetric lenses and one anamorphic lens, and
wherein the following condition is fulfilled:

$f_2 < f_3 < 3f_2$ where $f_2$ represents a focal length of a second axisymmetric lens from the deflection point side, and $f_3$ represents a focal length of a third axisymmetric lens from the deflection point side.

6. A laser beam scanning optical system as claimed in 1,
wherein the scanning lens system includes, from a deflection point side, three axisymmetric lenses and one anamorphic lens, and
wherein the following condition is fulfilled:

$|f_{4M}| > 2L$ where L represents a distance from the deflection point to an image plane, and $f_{4M}$ represents a focal length of the anamorphic lens in the main scanning direction.

7. A laser beam scanning optical system as claimed in claim 1,
wherein the scanning lens system includes, from a deflection point side, three axisymmetric lenses and one anamorphic lens, and
wherein the following condition is fulfilled:

$v_{d1} < 30$ where $v_{d1}$ represents an Abbe number of a first axisymmetric lens from the deflection point side.

8. A laser beam scanning optical system as claimed in claim 1,
wherein the scanning lens system includes, from a deflection point side, three axisymmetric lenses and one anamorphic lens, and
wherein the following condition is fulfilled:

$v_{d2} > 50$ where $v_{d2}$ represents an Abbe number of a second axisymmetric lens from the deflection point side.

9. A laser beam scanning optical system as claimed in claim 1,
wherein the scanning lens system includes, from a deflection point side, three axisymmetric lenses and one anamorphic lens, and
wherein the following condition is fulfilled:

$v_{d3} > 50$ where $v_{d3}$ represents an Abbe number of a third axisymmetric lens from the deflection point side.

10. A laser beam scanning optical system comprising:
a light source for emitting at least one laser beam;

a condenser lens for forming at least one laser beam emitted from the light source into at least one converging laser beam;

a deflector for deflecting each converging laser beam from the condenser lens; and a scanning lens system that includes a plurality of lenses made of optical materials having different dispersion that operatively corrects lateral chromatic aberration caused therein and that refracts each converging laser beam received from the deflector in such a way that the laser beam is condensed both in a main scanning direction and in a sub-scanning direction on a scanned surface, wherein the following condition is fulfilled:

$$0<\beta<3$$

where, $\beta$ represents magnification of the scanning lens system in the main scanning direction within a region close to an optical axis, wherein the light source is a light source for emitting a plurality of laser beams, wherein the condenser lens is a condenser lens for forming laser beams emitted from the light source into converging laser beams, and wherein the scanning lens system refracts deflected converging laser beams received from the deflector in such a way that the laser beams are condensed both in a main scanning direction and in a sub-scanning direction to be focused on the scanned surface while being moved across the scanned surface at a substantially uniform speed.

11. A laser beam scanning optical system as claimed in claim 10, wherein the laser beams emitted from the light source have different wavelengths from one another.

12. A laser beam scanning optical system as claimed in claim 10, wherein the following condition is fulfilled:

$$0<\beta<1.2.$$

13. A laser beam scanning optical system as claimed in claim 10, wherein the scanning lens system includes at least one lens having a negative axial power in the main scanning direction and at least one lens having a positive axial power in the main scanning direction, and wherein the following condition is fulfilled:

$$v_{dM}<v_{dP}$$

where $v_{dM}$ represents an Abbe number of a lens that has a strongest negative axial power in the main scanning direction, and $v_{dP}$ represents an Abbe number of a lens that has a strongest positive axial power in the main scanning direction.

14. A laser beam scanning optical system comprising:

a light source for emitting at least one laser beam;

a condenser lens for forming at least one laser beam emitted from the light source into at least one converging laser beam;

a deflector for deflecting each converging laser beam from the condenser lens; and a scanning lens system that includes a plurality of lenses made of optical materials having different dispersion that operatively corrects lateral chromatic aberration caused therein and that refracts each converging laser beam received from the deflector in such a way that the laser beam is condensed both in a main scanning direction and in a sub-scanning direction on a scanned surface, wherein the scanning lens system includes at least one lens having a negative axial power in the main scanning direction and at least one lens having a positive axial power in the main scanning direction, and wherein the following conditions are fulfilled:

$$0<\beta<3$$

$$v_{dM}<v_{dP}$$

where $\beta$ represents magnification of the scanning lens system in the main scanning direction within a region close to an optical axis;

where $v_{dM}$ represents an Abbe number of a lens that has a strongest negative axial power in the main scanning direction, and $v_{dP}$ represents an Abbe number of a lens that has a strongest positive axial power in the main scanning direction.

15. A laser beam scanning optical system comprising:

a light source for emitting at least one laser beam;

a condenser lens for forming at least one laser beam emitted from the light source into at least one converging laser beam;

a deflector for deflecting each converging laser beam from the condenser lens; and a scanning lens system that includes a plurality of lenses made of optical materials having different dispersion that operatively corrects lateral chromatic aberration caused therein and that refracts each converging laser beam received from the deflector in such a way that the laser beam is condensed both in a main scanning direction and in a sub-scanning direction on a scanned surface, wherein the scanning lens system includes, from a deflection point side, three axisymmetric lenses and one anamorphic lens, and wherein the following conditions are fulfilled:

$$-0.4L<f_1<-0.2L$$

$$0.3L<f_2<0.6L$$

$$f_2<f_3<3f_2$$

where:

L represents distance from a deflection point to an image plane;

$f_1$ represents a focal length of a first axisymmetric lens from the deflection point side;

$f_2$ represents a focal length of a second axisymmetric lens from the deflection point side; and $f_3$ represents a focal length of a third axisymmetric lens from the deflection point side.

16. A laser beam scanning optical system as claimed in claim 15, wherein the following condition is fulfilled:

$$|f_{4M}|>2L$$

where $f_{4M}$ represents a focal length of the anamorphic lens in the main scanning direction.

17. A laser beam scanning optical system as claimed in claim 16, wherein the following conditions are fulfilled:

$$\nu_{d1} < 30$$

$$\nu_{d2} > 50$$

$$\nu_{d3} > 50$$

where $\nu_{d1}$ represents an Abbe number of a first axisymmetric lens from the deflection point side;

$\nu_{d2}$ represents an Abbe number of a second axisymmetric lens from the deflection point side; and $\nu_{d3}$ represents an Abbe number of a third axisymmetric lens from the deflection point side.

* * * * *